United States Patent
Denner et al.

(10) Patent No.: US 8,341,726 B2
(45) Date of Patent: Dec. 25, 2012

(54) SYSTEM AND METHOD FOR CONTROLLING EMAIL PROPAGATION

(75) Inventors: Gary Denner, Co. Kildare (IE); Patrick Joseph O'Sullivan, Dublin (IE); Ruthie D. Lyle, Durham, NC (US); Carol Sue Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 11/781,586

(22) Filed: Jul. 23, 2007

(65) Prior Publication Data
US 2009/0031393 A1    Jan. 29, 2009

(51) Int. Cl.
*G06F 9/00*    (2006.01)
(52) U.S. Cl. ............ 726/14; 726/12; 713/154; 713/156; 713/170
(58) Field of Classification Search ............ 705/57; 713/154, 156, 170; 726/14, 12
See application file for complete search history.

(56) References Cited

U.S. PATENT DOCUMENTS

| | | | |
|---|---|---|---|
| 6,609,196 B1 * | 8/2003 | Dickinson et al. ............ | 713/154 |
| 6,920,564 B2 | 7/2005 | Decuir | |
| 7,792,911 B2 * | 9/2010 | Wilson ............ | 709/206 |
| 7,987,511 B2 * | 7/2011 | Brown et al. ............ | 726/27 |
| 2002/0104021 A1 * | 8/2002 | Gross ............ | 713/201 |
| 2003/0200267 A1 * | 10/2003 | Garrigues ............ | 709/206 |
| 2003/0233410 A1 | 12/2003 | Gusler et al. | |
| 2004/0049696 A1 | 3/2004 | Baker et al. | |
| 2004/0260710 A1 * | 12/2004 | Marston et al. ............ | 707/100 |
| 2006/0195527 A1 | 8/2006 | Allen et al. | |
| 2007/0005717 A1 | 1/2007 | LeVasseur et al. | |
| 2008/0010348 A1 * | 1/2008 | Dawson et al. ............ | 709/206 |

* cited by examiner

*Primary Examiner* — Eleni Shiferaw
*Assistant Examiner* — Paul Callahan
(74) *Attorney, Agent, or Firm* — Holland & Knight LLP; Brian J. Colandreo, Esq.; Jeffrey T. Placker, Esq.

(57) ABSTRACT

A system and method for controlling the propagation of an email message includes defining at least a first email recipient and a second email recipient of the email message. A first email propagation policy associated with at least the first email recipient is defined, and a second email propagation policy associated with at least the second email recipient is defined. The email message is sent to the first email recipient and to the second email recipient.

17 Claims, 6 Drawing Sheets

SYSTEM AND METHOD FOR CONTROLLING EMAIL PROPAGATION

TECHNICAL FIELD

This disclosure relates to email communications and, more particularly, to systems and methods for controlling the propagation or forwarding of email messages.

BACKGROUND

Generally, once an email message is sent to a recipient, the recipient is free to forward the email message to any number of subsequent recipients. That is, a recipient of an email message generally has an unlimited ability to forward or redistribute the received email message. The unrestricted ability to forward or retransmit email messages may be a serious problem, especially when handling confidential or sensitive information, such as marketing strategies, financial information, or personal information.

The available mechanisms for controlling the forwarding of email messages is relatively limited. An email sender may include the desired recipients in the to, cc, or bcc addressable fields, trusting that any of the intended recipients of the email will exercise the appropriate discretion and not forward the email message to any other users. This mechanism requires a high level of trust between the sender and the intended recipients.

Other options for controlling the forwarding of email messages include the use of "do not forward" flags, which may prevent any of the email recipients of a particular email message from forwarding the email message. While this mechanism may prevent all forwarding of the email message it may, at times, prove overly restrictive and cumbersome. For example, a manager may send email instructions or information to a supervisor with an active "do not forward" flag. The supervisor would then be prevented from forwarding the email to members of the supervisor's team, who may actually carry out the instructions, without requesting permission from the manager.

Another mechanism for controlling the downstream distribution of email messages is an "enterprise confidentiality flag." The "enterprise confidentiality flag" may allow unlimited forwarding of an email message within a company, while preventing the email message from being forwarded to recipients outside of the enterprise. In various situations, the "enterprise confidentiality flag" may prove to be overly restrictive and in other situations it may prove to be too permissive. For example, the "enterprise confidentiality flag" may complicate cooperative activities between two separate companies, e.g., by preventing emails sent with an active "enterprise confidentiality flag" from being forwarded to recipients in the cooperating company. Furthermore, while the "enterprise confidentiality flag" may prevent an email message from being forwarded to recipients outside of the company, the email message may still be freely forwarded to any recipient within the company.

SUMMARY OF THE DISCLOSURE

In a first implementation, a method includes defining at least a first email recipient and a second email recipient of an email message. A first email propagation policy is defined and associated with at least the first email recipient, and a second email propagation policy is defined and associated with at least the second email recipient. The email message is sent to the first email recipient and to the second email recipient.

One or more of the following features may be included. The first email propagation policy and the second email propagation policy may be permanently associated with the email message. The first email propagation policy may allow the first email recipient to forward the email message.

The second email propagation policy may prevent the second email recipient from forwarding the email message. Additionally, the second email propagation policy may define a set of subsequent recipients to whom the second email recipient can forward the email message. The second email propagation policy may additionally/alternatively define a time period during which the email message can be forwarded. Similarly, the second email propagation policy may limit the number of times the email message can be forwarded. The second email propagation policy may prevent the second email recipient from copying the email.

The method may include notifying at least one of the first email recipient and the second email recipient of the first email propagation policy and/or the second email propagation policy. The method may also include tracking an attempted violation of the second email propagation policy.

According to another implementation, a computer program product resides on a computer readable medium having a plurality of instructions stored thereon. When executed by a processor, the instructions may cause the processor to perform operations including defining at least a first email recipient and a second email recipient of an email message. A first email propagation policy may be defined and associated with at least the first email recipient, and a second email propagation policy may be defined and associated with at least the second email recipient. The email message may be sent to the first email recipient and to the second email recipient.

One or more of the following features may be included. Instructions for permanently associating the first email propagation policy and the second email propagation policy with the email message may be included. The first email propagation policy may allow the first email recipient to forward the email message.

The second email propagation policy may prevent the second email recipient from forwarding the email message. The second email propagation policy may define a set of subsequent recipients to whom the second email recipient can forward the email message. The second email propagation policy may define a time period during which the email message can be forwarded. The second email propagation policy may limit the number of times the email message can be forwarded. Still further, the second email propagation policy may prevent the second email recipient from copying the email.

The computer program product may include instructions for notifying at least one of the first email recipient and the second email recipient of the first email propagation policy and/or the second email propagation policy. The computer program product may also include instructions for tracking an attempted violation of the second email propagation policy.

The details of one or more implementations are set forth in the accompanying drawings and the description below. Other features and advantages will become apparent from the description, the drawings, and the claims.

DETAILED DESCRIPTION

Figure 1:
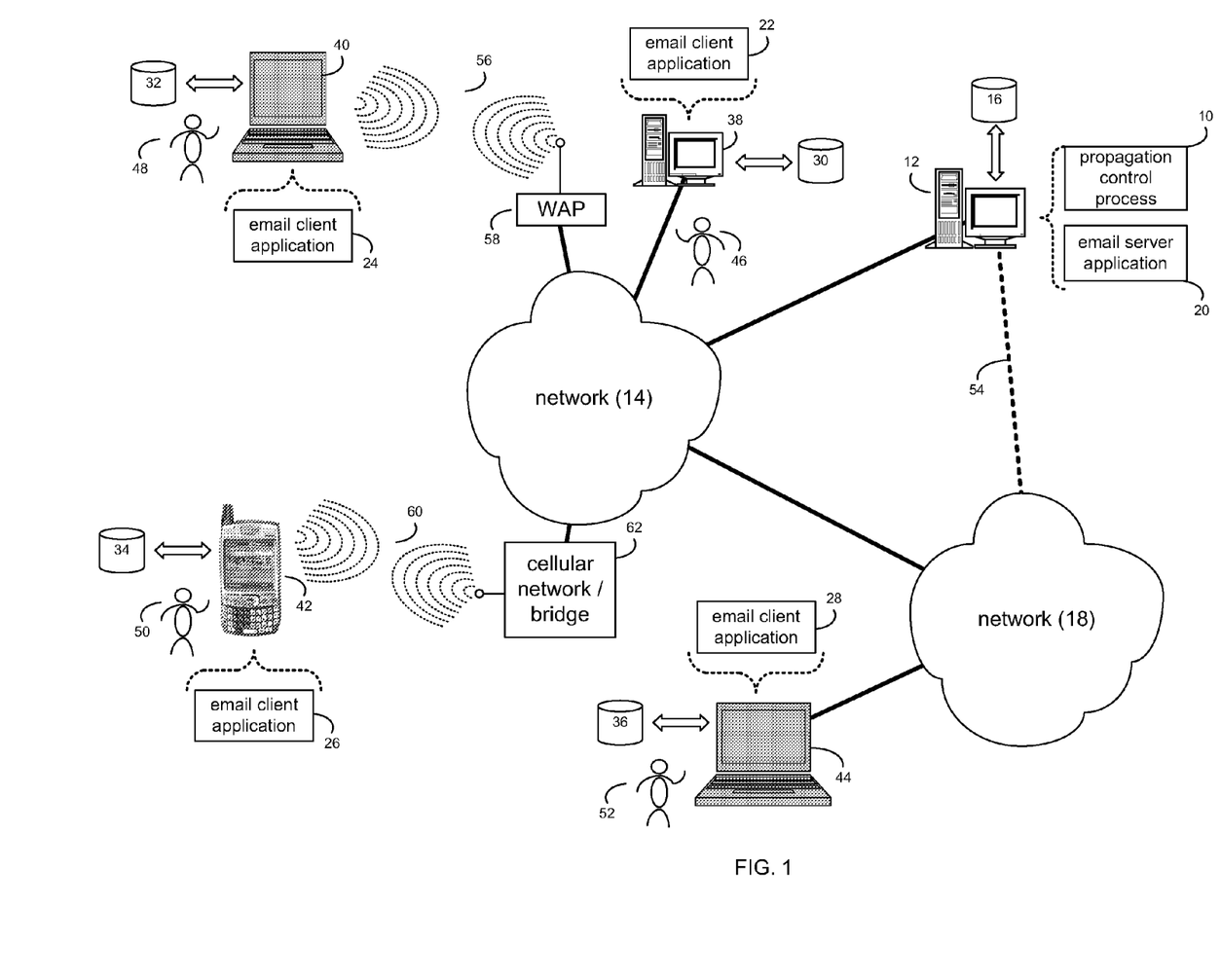
FIG. 1 diagrammatically depicts an email propagation process and an email application coupled to a distributed computing network.

Referring to FIG. 1, there is shown email propagation process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Alternatively, email propagation process may reside on a client electronic device, such as a personal computer, notebook computer, personal digital assistant, or the like. As will be discussed below in greater detail, email propagation process 10 may allow an email sender to define different email propagation policies for different email recipients of an email message.

The instruction sets and subroutines of data sharing process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute email server application 20, examples of which may include but are not limited to Lotus Domino™ Server and Microsoft Exchange™ Server. Mail server application 20 may be a mail transfer agent that may store and route email to one or more email client applications 22, 24, 26, 28, examples of which may include but are not limited to Lotus Notes™ and Microsoft Outlook™. Email propagation process 10 may be a stand alone application that interfaces with email server application 20 or an applet/application that is executed within email server application 20.

The instruction sets and subroutines of email server application 20, which may be stored on storage device 16 coupled to server computer 12 may be executed by one or more processors (not shown) and one or more memory architectures (not shown) incorporated into server computer 12.

In addition/as an alternative to being a server-based application residing on server computer 12, the email propagation process may be a client-side application residing on one or more client electronic devices 38, 40, 42, 44 (e.g., stored on storage devices 30, 32, 34, 36, respectively). As a client-side application, email propagation process may, e.g., be a stand alone application, interface with an email client application, or may be an applet/application that is executed within email client application. Accordingly, email propagation process may be a server-based process, a client-side process and/or may be a hybrid client-side/server-based process, which may be executed, in whole or in part, by email client application and by email server application.

The instruction sets and subroutines of email client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and a memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using email client applications 22, 24, 26, 28, users 46, 48, 50, 52 may access email server application 20 and may send, retrieve and/or organize email messages.

Users 46, 48, 50, 52 may access email server application 20 directly through the device on which the email client application (e.g., email client applications 22, 24, 26, 28) is executed, namely client electronic devices 38, 40, 42, 44, for example. Users 46, 48, 50, 52 may access email server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

Email Propagation Policy Process

Figure 2:
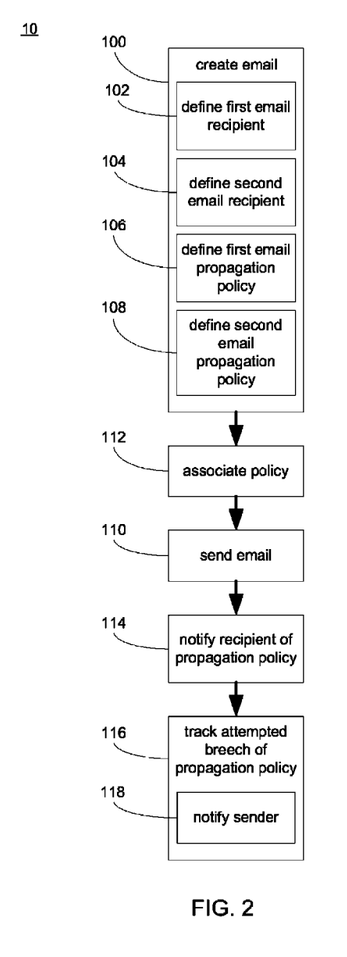
FIG. 2 is a flowchart of a process executed by the email propagation process of FIG. 1.

Referring also to FIG. 2, email propagation process 10 may allow a user to create 100 an email message. In creating the email, email propagation process 10 may allow the user to define 102 at least a first email recipient, and to define 104 at least a second email recipient of the email message. Once the first email recipient has been defined 102, the user may be allowed to define 104 a first email propagation policy associated with the first email recipient. Similarly, once the second email recipient has been defined 104, the user may be allowed to define 108 a second email propagation policy associated with the second email recipient. Email propagation process 10 may also allow the user to send 110 the email message to the first email recipient and to the second email recipient.

Figure 3:
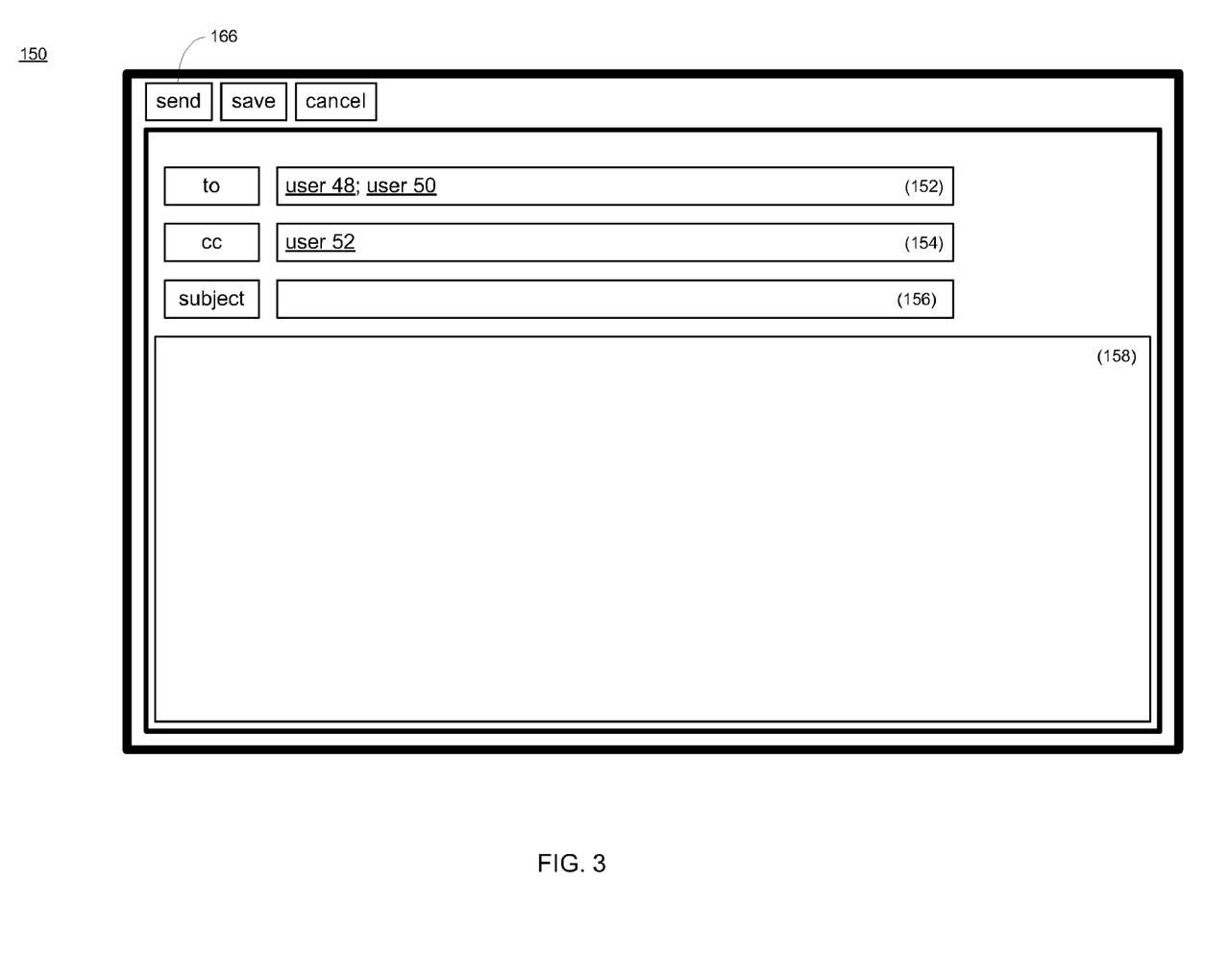
FIG. 3 is a diagrammatic view of a display screen rendered by the email propagation process and/or the email application of FIG. 1.

Referring also to FIG. 3, user 46 may, for example, create 100 an email using email client application 22. To create 100 the email, email client application 22 may render new email template 150, which may include, but is not limited to, recipient fields (e.g., "to" field 152, "cc" field 154, "bcc" field; not shown), subject field 156, as well as message body block 158. User 46 may define 102, 104 recipients of the email message in one or more of "to" field 152 and "cc" field 154. Recipients of the email message may be defined 102, 104 in various ways. For example, user 46 may select one of the recipient fields (e.g., "to" field 152 or "cc" field 154) by positioning onscreen pointer 160 in the field using a pointing device (e.g., mouse; not shown) and clicking. User 46 may then type the email address(es) of the intended recipients in one of the recipient fields. Alternatively, user 46 may define 102, 104 recipients of the email message, e.g., using a contacts list, or similar directory. For the particular example shown in FIG. 1, user 46 may define 102, 106 users 48, 50, 52 as recipients of the email message by placing their email addresses (namely: user 48; user 50; and user 52) in recipient fields (i.e., in "to" field 152, and "cc" field 154).

Once user 46 has defined 102, 104 email recipients of the email message, user 46 may define email propagation policies for the various email recipients (user 48, user 50, user 52). For example, user 46 may define 106 a first email propagation policy for user 48, and may define 108 a second email propagation policy for user 50. In general, the email propagation policies may determine and/or influence the usage of the email message by the recipients. For example, the email propagation policies may affect a recipient's ability to forward the email to subsequent recipients, to copy the email, and so forth. The email propagation policies established by the email sender may be embedded in the email, e.g., and be permanently associated 112 with the email message. As such, on any attempts by an original, or subsequent, email recipient to forward, copy, or perform other actions relative to the email, the email propagation policies may be enforced by the email application or system.

Continuing with the above-stated example, user 46 may define 106 one or more email propagation policies associated with one of the email recipients, e.g., user 48. The email propagation policy may be defined 106 for, and associated with, user 48 in various ways. For example, and with reference also to FIG. 4, user 46 may position onscreen pointer 160 on the email address of user 48 using a pointing device (e.g., a mouse; not shown) and may "right click" resulting in email propagation process 10 rendering email propagation policy popup menu 162. Popup menu 162 may define a plurality of available email propagation policies including, but not limited to, "forward", "do not forward", "limited forward", "copy", "do not copy", "hide", and "notify", for example. User 46 may select (e.g., using onscreen pointer 160 controlled by a pointing device, such as a mouse; not shown) one or more of the defined email propagation policies from popup menu 162 be associated with email recipient user 48. For example, user 46 may select "forward" from popup menu 162, allowing user 48 to forward the email message to subsequent email recipients.

Figure 4:
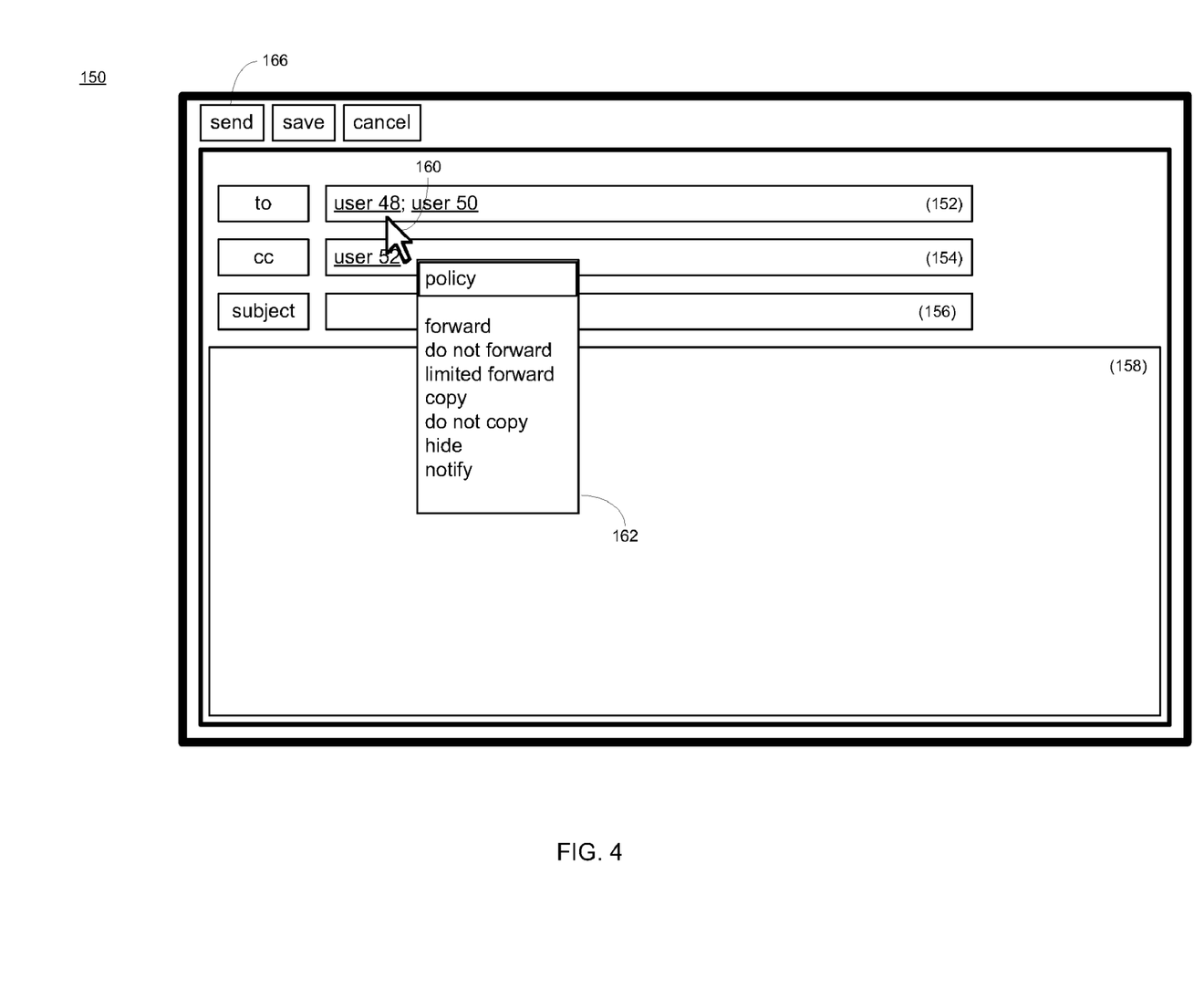
FIG. 4 is a diagrammatic view of a display screen rendered by the email propagation process and/or the email application of FIG. 1.
Figure 5:
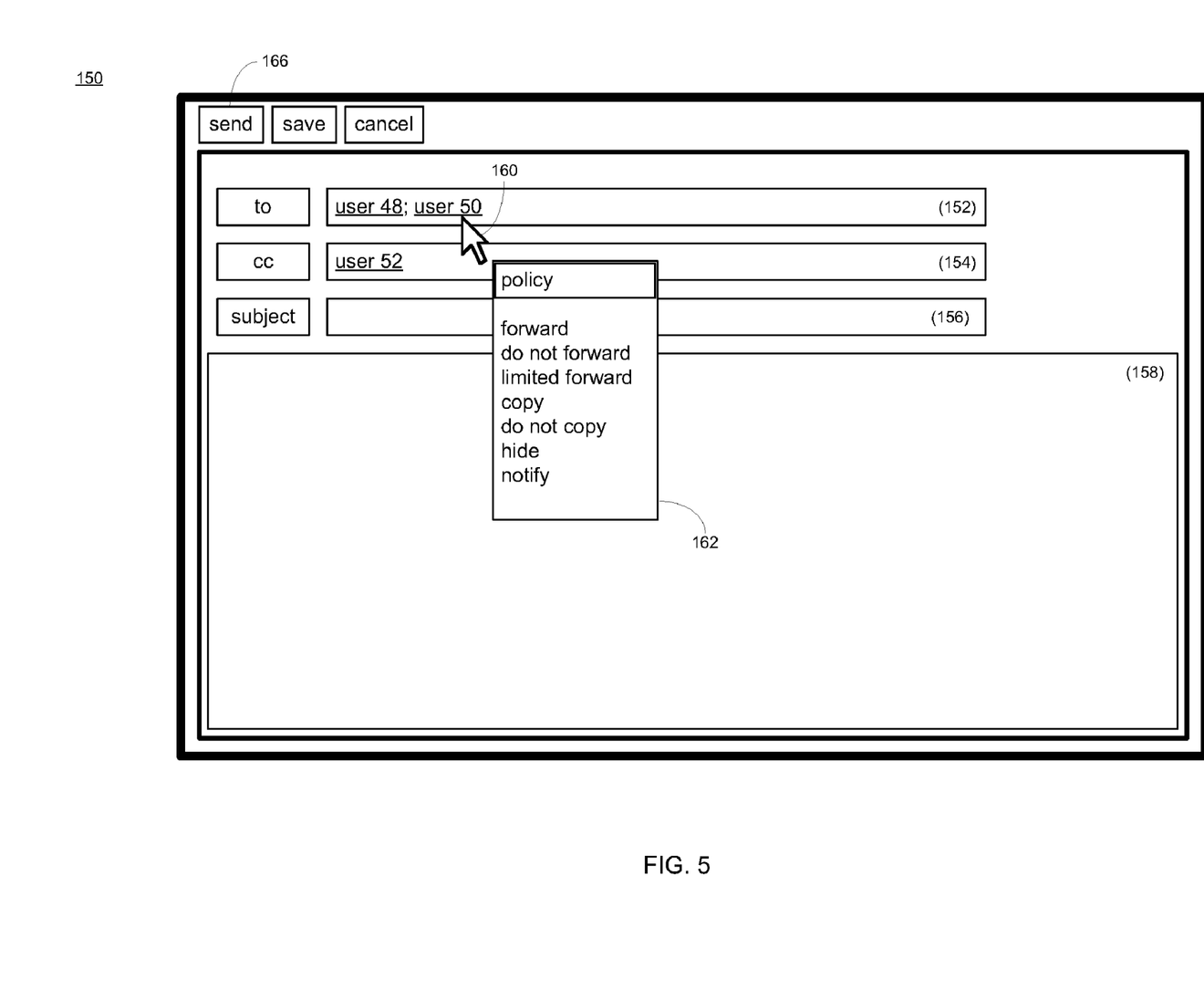
FIG. 5 is a diagrammatic view of a display screen rendered by the email propagation process and/or the email application of FIG. 1.

Continuing with the above-stated example, user 46 may similarly define 108 one or more email propagation policies associated with another of the email recipients, e.g., user 50. An email propagation policy defined 108 for, and associated with, user 50 may be the same as or different than the email propagation policy associated with user 48. As described above, user 46 may position onscreen pointer 160 on the email address of user 50 and "right click", resulting in email propagation process 10 rendering email propagation policy popup menu 162. User 46 may select one or more desired email propagation policies from popup menu 162.

User 46 may select (e.g., using onscreen pointer 160 controlled by a pointing device, such as a mouse; not shown) "do not forward" from popup menu 162. Selecting "do not forward" may define 108 the email propagation policy for email recipient user 50 as a prohibition on forwarding the email message. In such an example, while user 48 may be able to forward the email message to subsequent email recipients, user 50 may be prohibited from forwarding the email to others.

Figure 6:
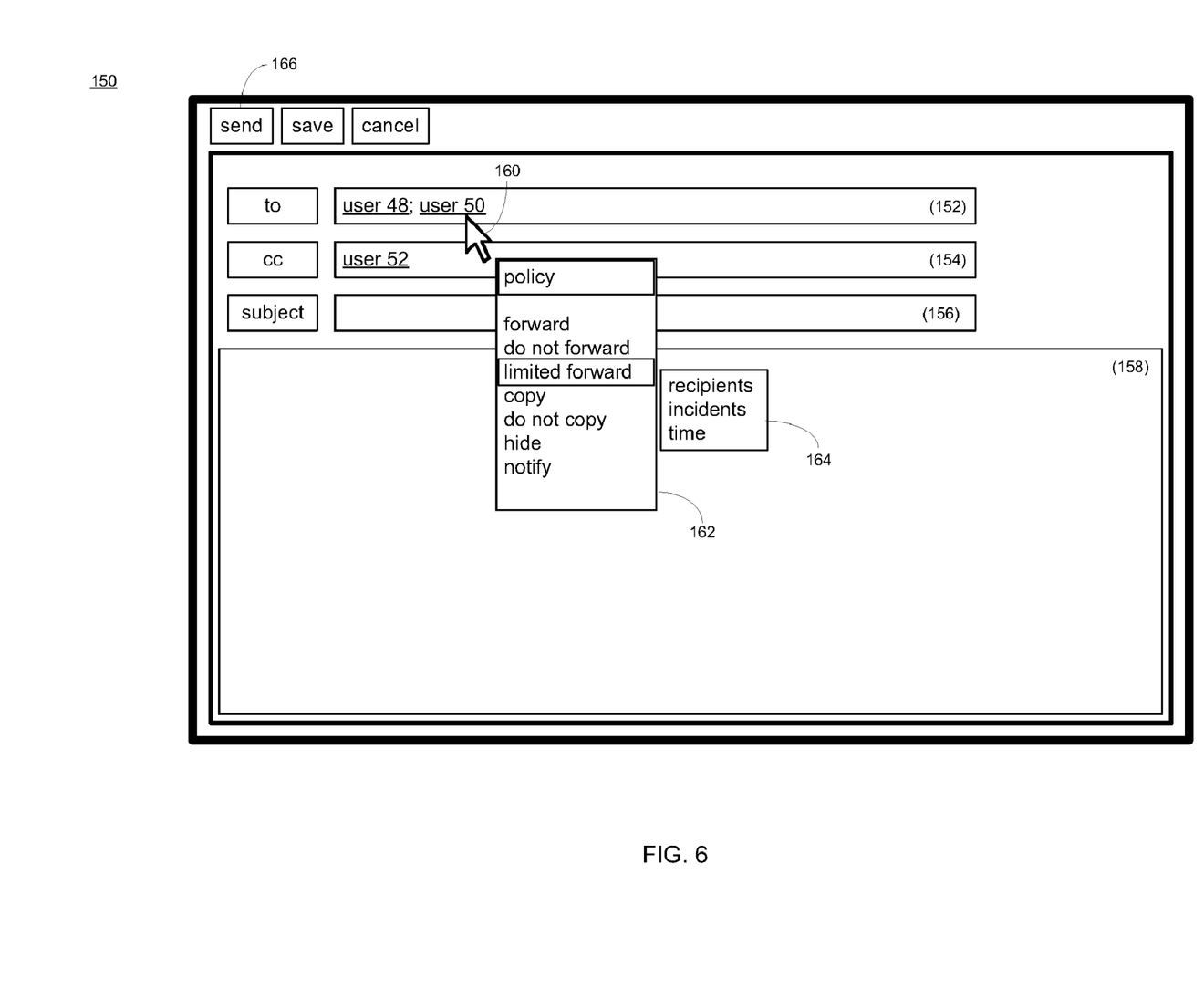
FIG. 6 is a diagrammatic view of a display screen rendered by the email propagation process and/or the email application of FIG. 1.

Referring also to FIG. 6, user 46 may select "limited forward" from popup menu 162, e.g., to define 108 an email propagation policy associated with user 50 including a restriction on forwarding of the email message to subsequent email recipients that may be less than a total prohibition on forwarding. As shown, selecting "limited forward" from popup menu 162 may result in email propagation policy process 10 rendering popup submenu 164, which may define a plurality of limited forward email propagation policy options. Limited forward email propagation policy options may include, but are not limited to, limited forwarding rights based, at least in part, upon "recipients", "incidents" and "time", for example. User 46 may select "recipients" from popup submenu 164 to define 108 an email propagation policy associated with email recipient user 50 that may limit user 50's rights to forward the email message to a defined set of subsequent email recipients. For example, user 46 may define one or more specific recipients to whom user 50 may subsequently forward the email message. For example, selecting "recipients" in popup submenu 164 may render a recipients popup menu (not shown) in which user 46 may define the recipients to whom user 50 may forward the email message.

User 46 may define specific individual subsequent recipients for subsequent forwarding (e.g., by inputting the subsequent recipients' email addresses). Additionally/alternatively, user 46 may generally define the subsequent recipients based on inclusion in an established email group, domain, country, or the like. For example, email recipient user 50 may be part of the development team. User 46 may define the subsequent recipients as being members of the development team, allowing user 50 to forward the email message to all members of the development team. The members of the development team may change over time, resulting in updating of the email group of the development team. User 50 may, based on the email propagation policy, for example forward the email to later added members of the development team.

Various other schemes for defining email recipients to whom the email message may be forwarded may also be used.

As mentioned, defining the subsequent recipients for subsequent forwarding may include defining the subsequent recipients based on inclusion in an established email group, domain, country, or the like. The inclusion of subsequent recipients in an established email group may be indicated by reference to a user registry, e.g., a corporate directory, a shared email contact directory, or the like. For example, user 46 may define the subsequent recipients as members of department XYZ, the members of which are listed in a corporate directory. As such, the set of subsequent recipients may be dynamically generated. The dynamically generated set of allowed subsequent recipients may reflect the current members of department XYZ, accounting for any personnel changes that may have occurred since the set of subsequent recipients was defined.

Defining the subsequent recipients for subsequent forwarding may include the use of wild cards on domains. For example, user 46 may define the set of subsequent recipients as "*.us.ibm.com". As such, the email may be subsequently forwarded to any person in IBM USA. Similarly, user 46 may define the set of subsequent recipients as "*.edu". In this situation, the email may be forwarded to any person having an email address associated with a university or college. Similar wild card usage may be employed to restrict subsequent forwarding of the email address by country, or the like.

In addition to defining recipients for subsequent forwarding, user 46 may define the number of forwarding incidents (e.g., the number of times the email message may be forwarded). For example, user 46 may select "incidents" in popup submenu 164. Selecting "incidents" in popup submenu 164 may result in email propagation policy process 10 rendering an additional popup (not shown), in which user 46 may input (e.g., using a keyboard) the number of permitted forwarding incidents, or may select the number of permitted forwarding incidents, e.g., from a rendered list.

The defined number of forwarding incidents may define the total number of time that user 50 may forward the email message and/or may define the total number of time the email message received by user 50 may be forwarded. For example, if the number of forwarding incidents is defined as four, in one embodiment user 50 may forward the email message to four separate subsequent recipients, who may or may not be permitted to forward the email message, depending upon configuration. In another example, with a defined number of forwarding incidents set to four, user 50 may forward the email message to one or more subsequent recipients, who may, in turn, forward the email message to one or more additional subsequent recipients, e.g., for a total of four rounds of forwarding. In such an embodiment, while the email message may be distributed to a limited degree, the overall proliferation of the email message may be controlled or limited. Various combinations of the defined number of forwarding incidents may also be utilized.

The limited forwarding email propagation policy defined 108 by user 46 and associated with user 50 may establish a time frame during which the email message may be forwarded. Still continuing with the above-stated example, user 46 may select "time" in popup submenu 164, which may result in, for example, an additional popup (not shown) or the like being rendered by email propagation policy process 10. User 46 may be allowed to define a time period during which the email sent 110 to user 50 may be forwarded. For example, user 46 may set a time period of one week. User 50 may forward the email message for a period of one week, after which user 50 may be prevented from forwarding the email message. In a particular embodiment, any subsequent recipients of the email message forwarded from user 50 may subsequently forward the email message during the one week period. After the time period for forwarding the email message has expired, any subsequent email recipients who received the email message forwarded, directly or indirectly, from user 50 may be prevented from subsequently forwarding the email message.

The defined 108 email propagation policy associated with the second email recipient may prevent the second email recipient from copying the email. For example, user 46 may select "do not copy" in popup menu 162. In this example, the defined 108 email propagation policy associated with user 50 may prevent user 50 from copying the email message and/or portions of the email message. User 50 may be permitted to forward the email message to subsequent recipients.

The sender of the email may define 106, 108 one or more email propagation policies that may delegate the ability to edit the one or more email propagation policies and/or add additional email propagation policies. For example, user 46 may send an email to users 50, 52. User 46 may define 106 an email propagation policy associated with user 50 that restricts any subsequent propagation by user 50. User 46 may define 108 an email propagation policy associated with user 52 that delegates the ability to add or edit the email propagation policies. As such, user 52 may edit the email propagation policy associated with user 50, e.g., to allow user 50 to forward the email to a defined subsequent recipient, or other such modification.

While various email propagation policies have been separately discussed, the sender of the email may define 106, 108 one or more email propagation policy associated with defined 102, 104 email recipients. For example, user 46 may define 108 email propagation policies associated with email recipient user 50 including "do not forward" and "do not copy". In this example, not only would user 50 be prevented from forwarding the email message, user 50 may also be prevented from copying the email message. Various other combinations of email propagation polices may be defined 104, 106 for various ones of the defined 102, 104 email recipients.

As discussed above, user 46 may have defined 106 an email propagation policy associated with email recipient user 48, which may be different than the defined 108 email propagation policy associated with user 50. As such different email propagation policies may be defined for various different email recipients. For example, while limitations may be placed on the ability of user 50 to forward the email message and/or to copy the email message, the defined 106 email propagation policy associated with user 48 may allow user 48 to freely forward and/or copy the email message. Additionally/alternatively, restrictions may be placed on forwarding and/or copying of the email message by user 48 that may be, at least in part, different from those placed on forwarding and/or copying of the email message by user 50.

As discussed above, once user 46 has defined 102, 104 one or more email recipients of the email message, and had defined 106, 108 email propagation policies for the one or more email recipients, user 46 may send the email message to the defined email recipients. For example, in a conventional manner, user 46 may select "send" button 166 associated with email template 150.

Email propagation policy process 10 may notify 114 one or more of the email recipients of the email propagation policy defined 106, 108 for, and associated with, the one or more email recipients. For example, the email message received by an email recipient may include a caption indicating the email propagation policy, such as "email message cannot be forwarded", or other applicable notice. Email propagation policy process 10 may always notify 114 an email message recipient of any relevant email propagation policy. Alternatively, email propagation policy process 10 may allow the sender of the email message to selectively notify the recipient of any applicable email propagation policy. Continuing with the above-stated example, when user 46 defines 108 an email propagation policy associated with user 50, user 46 may choose to notify 114 user 50 of the email propagation policy, or may choose to hide the email propagation policy (i.e., not notify user 50). For example, when user 46 defines 108 the email propagation policy, user 46 may select "hide" or "notify" in popup menu 16, respectively hiding the email propagation policy from user 50, or notifying user 50 of the associated email propagation policy.

Email propagation policy process 10 may also track 116 any attempted violations of a defined 106, 108 email propagation policy. For example, user 46 may define 108 an email propagation policy associated with email recipient user 50 that may prohibit user 50 from forwarding the email message. Despite the email propagation policy prohibiting user 50 from forwarding the email message, user 50 may, nonetheless, attempt to forward the email message. While the email propagation policy may prevent the email message from being forwarded, email propagation policy process 10 may track 116 the attempted violation. Tracking 116 the attempted violation of the email propagation policy may include, for example, keeping a record (e.g., in a database or the like) of the attempted violation and the user (e.g., user 50) who attempted to violate the email propagation policy. Tracking 116 the attempted violation of the email propagation policy may include notifying 118 the sender of the email message (e.g., user 46) of the attempted violation. For example, an attempted violation of the email propagation policy may result in email propagation policy process 10 sending a notice (e.g., an email, instant message, text message, or the like) to user 46. As such, user 46 may be made aware of the attempted violation of the email propagation policy.

A number of implementations have been described. Nevertheless, it will be understood that various modifications may be made. Accordingly, other implementations are within the scope of the following claims.

What is claimed is:

1. A method comprising:
defining, on an email client device, at least a first email recipient and a second email recipient of an email message;
providing, on the email client device, one or more features allowing an email client application user to create one or more email propagation policies;
defining, on the email client device, a first email propagation policy associated with at least the first email recipient;
defining, on the email client device, a second email propagation policy associated with at least the second email recipient, wherein the second email propagation policy defines a time period during which the email message can be forwarded;
embedding, by the email client device, the first email propagation policy and the second email propagation policy in the email message, wherein:
the first email propagation policy and the second email propagation policy are configured to be permanently associated with the email message and enforced by an email application; and
at least one of the first email propagation policy and the second email propagation policy delegates to at least one of the first email recipient and second email recipient an ability to edit at least one of the first email propagation policy and the second email propagation policy; and
sending, on the email client device, the email message to the first email recipient and to the second email recipient.

2. The method of claim 1, wherein the first email propagation policy allows the first email recipient to forward the email message.

3. The method of claim 1, wherein the second email propagation policy prevents the second email recipient from at least one of:
forwarding the email message; and
copying the email.

4. The method of claim 1, wherein the second email propagation policy further defines a set of subsequent recipients to whom the second email recipient can forward the email message.

5. The method of claim 1, wherein the second email propagation policy limits the number of times the email message can be forwarded.

6. The method of claim 1, further including notifying at least one of the first email recipient and the second email recipient of the at least one of the first email propagation policy and the second email propagation policy.

7. The method of claim 1, further including tracking an attempted violation of the second email propagation policy.

8. The method of claim 1, wherein the second email propagation policy limits the number of rounds of forwarding for the email message.

9. A computer program product residing on a non-transitory computer readable storage medium having a plurality of instructions stored thereon which, when executed by a processor, cause the processor to perform operations comprising:
defining at least a first email recipient and a second email recipient of an email message;
defining a first email propagation policy associated with at least the first email recipient;
defining a second email propagation policy associated with at least the second email recipient, wherein the second email propagation policy defines a time period during which the email message can be forwarded;
embedding the first email propagation policy and the second email propagation policy in the email message, wherein:
the first email propagation policy and the second email propagation policy are configured to be permanently associated with the email message and enforced by an email application; and
at least one of the first email propagation policy and the second email propagation policy delegates to at least one of the first email recipient and second email recipient an ability to edit at least one of the first email propagation policy and the second email propagation policy; and
sending the email message to the first email recipient and to the second email recipient.

10. The computer program product of claim 9, wherein the first email propagation policy allows the first email recipient to forward the email message.

11. The computer program product of claim 9, wherein the second email propagation policy prevents the second email recipient from at least one of:
forwarding the email message; and
copying the email.

12. The computer program product of claim 9, wherein the second email propagation policy further defines a set of subsequent recipients to whom the second email recipient can forward the email message.

13. The computer program product of claim 9, wherein the second email propagation policy limits the number of times the email message can be forwarded.

14. The computer program product of claim 9, further including instructions for notifying at least one of the first email recipient and the second email recipient of the at least one of the first email propagation policy and the second email propagation policy.

15. The computer program product of claim 9, further including instructions for tracking an attempted violation of the second email propagation policy.

16. The computer program product of claim 9, wherein the second email propagation policy limits the number of rounds of forwarding for the email message.

17. A method comprising:
  defining, on an email server device, at least a first email recipient and a second email recipient of an email message;
  rendering, on the email server device, an email propagation policy popup menu in response to selecting at least one of the first email recipient and the second mail recipient;
  defining, on the email server device, a first email propagation policy associated with at least the first email recipient;
  defining, on the email server device, a second email propagation policy associated with at least the second email recipient;
  wherein at least one of the first email propagation policy and the second email propagation policy are associated with at least one of the first email recipient and the second email recipient in response to selecting at least one of the first email propagation policy and the second email propagation policy from the email propagation policy popup menu;
  embedding, by the email server device, the first email propagation policy and the second email propagation policy in the email message, wherein:
    the first email propagation policy and the second email propagation policy are configured to be permanently associated with the email message and enforced by an email application; and
    at least one of the first email propagation policy and the second email propagation policy delegates to at least one of the first email recipient and second email recipient an ability to edit at least one of the first email propagation policy and the second email propagation policy; and
  sending, on the email server device, the email message to the first email recipient and to the second email recipient.

* * * * *